(12) United States Patent
Ericson

(10) Patent No.: US 7,422,154 B2
(45) Date of Patent: Sep. 9, 2008

(54) APPARATUS AND METHODS RELATING TO IMAGE CODING

(75) Inventor: Petter Ericson, Malmö (SE)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 11/525,996

(22) Filed: Sep. 25, 2006

(65) Prior Publication Data

US 2007/0075151 A1 Apr. 5, 2007

(51) Int. Cl.
*G06K 7/10* (2006.01)

(52) U.S. Cl. .................................. 235/462.11; 235/375

(58) Field of Classification Search ..............................
235/462.01–462.25, 380, 375, 383, 381, 235/494; 707/10, 200; 725/100
See application file for complete search history.

(56) References Cited

U.S. PATENT DOCUMENTS

| | | | |
|---|---|---|---|
| 4,389,712 A | 6/1983 | Frattarola et al. | |
| 4,994,987 A * | 2/1991 | Baldwin | 434/305 |
| 5,091,966 A | 2/1992 | Bloomberg et al. | |
| 5,128,525 A | 7/1992 | Stearns et al. | |
| 5,168,147 A | 12/1992 | Bloomberg | |
| 5,221,833 A | 6/1993 | Hecht | |
| 5,238,272 A * | 8/1993 | Taylor | 283/79 |
| 5,245,165 A | 9/1993 | Zhang | |
| 5,315,098 A | 5/1994 | Tow | |
| 5,416,312 A | 5/1995 | Lamoure | |
| 5,449,896 A | 9/1995 | Hecht et al. | |
| 5,453,605 A | 9/1995 | Hecht et al. | |
| 5,486,686 A * | 1/1996 | Zdybel et al. | 235/375 |
| 5,506,697 A * | 4/1996 | Li et al. | 358/448 |
| 5,537,223 A | 7/1996 | Curry | |
| 5,572,010 A | 11/1996 | Petrie | |
| 5,640,193 A * | 6/1997 | Wellner | 725/100 |
| 5,661,506 A | 8/1997 | Lazzouni et al. | |
| 5,706,099 A | 1/1998 | Curry | |
| 5,765,176 A * | 6/1998 | Bloomberg | 715/514 |
| 5,852,434 A | 12/1998 | Sekendur | |
| 5,862,255 A * | 1/1999 | Davies et al. | 382/183 |
| 5,862,271 A | 1/1999 | Petrie | |
| 5,864,127 A | 1/1999 | Jackson et al. | |
| 5,872,616 A * | 2/1999 | Hamilton | 355/40 |

(Continued)

FOREIGN PATENT DOCUMENTS

EP 0171284 A2 2/1986

(Continued)

OTHER PUBLICATIONS

Dymetman, Marc and Max Copperman, "Intelligent Paper", Xerox Research Centre Europe, pp. 392-406, XP-002328425, 1998.

*Primary Examiner*—Thien M Le
(74) *Attorney, Agent, or Firm*—Birch, Stewart, Kolasch & Birch, LLP

(57) ABSTRACT

A product has a coding pattern on its surface. The coding pattern may include symbols representing at least two different values and where each symbol comprises a raster point and at least one marking. The raster point is included in a raster that extends over the surface and the value of each symbol is indicated by the placement of the marking in relation to the raster point. The markings may each have a spatial extent that, in combination, may at least partially form the image.

23 Claims, 5 Drawing Sheets

U.S. PATENT DOCUMENTS

| | | | |
|---|---|---|---|
| 5,901,224 A * | 5/1999 | Hecht | 713/179 |
| 5,939,703 A | 8/1999 | Hecht et al. | |
| 6,000,613 A | 12/1999 | Hecht et al. | |
| 6,076,734 A | 6/2000 | Dougherty et al. | |
| 6,076,738 A | 6/2000 | Bloomberg et al. | |
| 6,330,976 B1 | 12/2001 | Dymetman et al. | |
| 6,341,730 B1 | 1/2002 | Petrie | |
| 6,345,304 B1 | 2/2002 | Dymetman et al. | |
| 6,419,162 B1 | 7/2002 | Petrie et al. | |
| 6,470,096 B2 | 10/2002 | Davies et al. | |
| 6,594,406 B1 | 7/2003 | Hecht | |
| 6,641,053 B1 | 11/2003 | Breidenbach et al. | |
| 6,665,490 B2 | 12/2003 | Copperman et al. | |
| 6,678,425 B1 | 1/2004 | Flores et al. | |
| 6,788,982 B1 | 9/2004 | Lapstun et al. | |
| 6,813,039 B1 | 11/2004 | Silverbrook et al. | |
| 6,915,103 B2 | 7/2005 | Blume | |
| 6,964,374 B1 * | 11/2005 | Djuknic et al. | 235/462.01 |
| 2004/0139121 A1 * | 7/2004 | Nagaraj et al. | 707/200 |

FOREIGN PATENT DOCUMENTS

| | | |
|---|---|---|
| JP | 10-257309 | 9/1998 |
| WO | WO 92/17859 | 10/1992 |
| WO | WO 98/20446 | 5/1998 |
| WO | WO 00/73887 A1 | 12/2000 |
| WO | WO 00/73981 A1 | 12/2000 |
| WO | WO 01/16691 A1 | 3/2001 |
| WO | WO 01/26032 A1 | 4/2001 |
| WO | WO 01/26033 A1 | 4/2001 |

* cited by examiner

APPARATUS AND METHODS RELATING TO IMAGE CODING

CROSS-REFERENCE TO RELATED APPLICATIONS

This application claims priority benefits based on Swedish Patent Application No. 0000950-6, filed Mar. 21, 2000, and U.S. patent application Ser. No. 09/812,901, filed Mar. 21, 2001, the technical disclosures of each of which are hereby incorporated herein by reference.

FIELD OF THE INVENTION

The present invention relates to pattern recognition and detection. Specifically, the present invention relates to methods and apparatuses for reading information from images stored as a pattern on a surface.

BACKGROUND OF THE INVENTION

In many contexts, both commercial and scientific, it is important to create an image on a surface, where the image contains as much information as possible. In this context, images can comprise, for example, photographically produced images of real objects and artificially generated images where information is represented by structures of varying blackness. In addition to the information, which is directly visible from the varying blackness over the image, it can be of use to add information to the image that is not directly apparent from the structures of varying blackness.

In U.S. Pat. No. 5,315,098 methods and means are illustrated which encode digital data in the angular orientation of circularly asymmetric halftone dot patterns that are written into the halftone cells of digital halftone images.

A drawback of the invention presented in U.S. Pat. No. 5,315,098 is that its use is restricted to applications where the halftone cells are of constant spatial extension across an image. Another restriction is that the halftone information in the cells is restricted in spatial extent in that it must have an elongated shape. This means that each halftone cell must contain an empty area thus reducing the overall dynamic range of the image.

It is also of importance to be able to read and interpret this information in the images applied to the surface, by means of reading apparatus. Examples can extend from applying and reading images on paper surfaces to applying and reading information from surfaces on products such as containers etc.

SUMMARY OF A FEW ASPECTS OF THE INVENTION

Systems, methods, and apparatus consistent with the present invention may employ coding patterns applied to "products" such as paper, computer disks, maps, or like material, which can hold an image. The coding pattern in accordance with invention may be in the form of an image that may be produced with the aid of a screen-printing technique.

A product according to the invention thus may employ a surface with an image in the form of a coding pattern. The coding pattern may include symbols representing at least two different values, wherein each symbol includes a raster point and at least one marking, the raster point being included in a raster extending over the surface. The value of each symbol may be indicated by the placement of the marking in relation to a raster point and the markings may each have a spatial extent that, in combination, at least partially forms the image.

In slightly more specific terms, these two aspects of the invention can be described by an original image that may be printed, for example, in a newspaper or other publication, normally being printed according to a screen-printing technique which consists of the image being printed as a plurality of small points which are regularly arranged in a raster (i.e., a grid network with one point at each crossing between two lines). Different degrees of density i.e., graytones, may be produced in the image by the points being made to be of different size. In an area that is to be black, the points may be made large and in an area that is to be light, the points may be made smaller. One concept according to the invention may be to code additional information, for example, in the form of positions, text, numbers etc., in the image by the center of gravity of each point being displaced from its normal position in the grid network. For example, if the point is displaced a given distance upward from the normal position in the grid network, the point may code the value 00, the same distance to the right the point codes the value 10, the same distance downward may give the value 11 and the same distance to the left may give the value 01. A set of displaced points together may give binary numbers that code information. Since the points may be relatively small and the displacements may also be relatively small, there appears to be no difference to the naked eye in the image, but with an apparatus according to the invention, the displacement of the points may be read and the information in the image may be decoded. As mentioned, the coded information can be, for example, positions that make it easier to scan in the image, or text, for example, an explanation of the image, or copyright information.

To summarize, these two aspects of the invention illustrate how an information-coding pattern may be used to create an image with which a user can interact. As will be discussed further below, the information contained in the raster of an image will be readable with the help of a reading device. An example of an application of the invention according to the above discussed aspects, is to produce, e.g., newspapers or magazines wherein images are printed with a coding pattern as discussed. A reader/user will then, depending on the information contained in the coding pattern, be able to "interact" with the images to the extent that the reading device will be able to convey the further information contained in the image.

Such an application is envisaged in a system for handling digitized information, wherein the system comprises a database of information relating to a virtual area consisting of all position coordinates that a position coding pattern described herein is capable of encoding. The virtual area is separated into regions, to each of which rules are associated, where the rules state how the system is to handle encoded information emanating from an apparatus reading the coding pattern. Regions associated with different rules may, or may not, be visible to the eye when printed on a product.

An apparatus for reading the coding pattern hence communicates with, e.g., a server in a computer network or with a more local computer, in which server or computer a matching procedure takes place between received position codes and the database. After the matching, actions are taken in accordance with the rules associated with the region matching the received position coding information. Examples of such actions include further information retrieval and presentation from computer servers, via e.g. Internet, associated with a printed image in, e.g., a magazine, catalogue or book. The further presentation of information may be of any "multimedia" character and include images, moving images and sound. Other actions, which may be handled according to the rules, include interaction between the reader/viewer and an actor associated with the region in question. Such interaction may be any electronic commerce interactions such as ordering products, financial services etc.

In the context of the invention, the term "image" should be given a broad interpretation, including all kinds of graphic reproductions. Apart from photographic reproduction, images in the form of traditional forms and layouts may be created, where lines and boxes are visualized by the image in the form of the coding pattern. Examples of such forms are to be found in applicant's international patent applications WO 00/73981, WO 00/73887 and WO 01/16691, all of which are hereby included by reference.

A specific advantage of the invention is that, by printing an image using a coding pattern containing further information which enables interaction, it allows for more flexibility when providing products with images. More space can be appointed to images as compared to traditional presentations where barcodes, tick-boxes etc. are used. Moreover, it is advantageous that the printing of the image and the coding pattern is performed in one and the same step.

Needless to say, a product according to the invention can be made more aesthetically pleasing to view in that the image itself comprises the regions allowing the interaction.

A general advantage of pattern and pattern production according to the aspects of the invention is more or less related to the fact that this is a digital operation. The positions of the markings are entered and interpreted as binary numbers, in which case the equipment to be used can be of relatively simple nature.

According to the aspects of the invention pattern and pattern production may be more or less related to the fact that this may be a digital operation. The positions of the markings may be entered and interpreted as binary numbers, in which case the equipment to be used can be of relatively simple nature.

A more or less problematic situation which can arise in the printing of markings, i.e. screen-printing points, with varying spatial extents may be of course that the markings can overlap one another in certain areas. These areas may be characterized by a relatively high density. Such overlaps may make it more difficult to determine the location of single markings and thus make it more difficult to read the additional information coded in the markings. Certainly, the problem can be avoided by markings that can be expected to overlap being limited in their spatial extents even before the printing. However, this entails limiting the dynamic range with respect to the density variation that characterizes the image printed with the coding pattern.

Known solutions with respect to the determination of the locations of overlapping markings can be drawn from, for example, the technique of astrometrically determining positions of imaged stars that are located in dense star fields. This technique tells us that with knowledge gathered in advance about the appearance, in the form of intensity distribution within the markings, of single markings, the positions of the markings, i.e. the positions of the stars, can be determined even if a plurality of the markings overlap one another. Three-dimensional pattern recognition algorithms are applied that more or less directly give, for example, the center point of a marking that "flows together" with adjoining markings.

A disadvantage of astrometrical techniques is that they presuppose advance knowledge of the three-dimensional appearance of the markings and their intensity distribution. This assumption may be the only way for a pattern recognition algorithm to deliver a reasonable assumption regarding the center point of the marking.

With an appearance, i.e., spatial extent (form) and size, determined in advance for each one of the markings that are to constitute a pattern, a pattern can be produced according to the invention. Markings may be provided with changes determined in advance. The changes occur advantageously in the spatial configuration of the markings and can be more or less regular. The changes may preferably be so regular that it may be possible in subsequent reading of the pattern with its markings to recognize the markings, when an identification of the change is made, without necessarily having read the marking in its complete spatial extent. Once the marking is recognized, for example, its center point can be determined.

The changed markings can imply, for example, that overlapping markings comprise at least one contrasting indicator, the spatial extent and place within the marking that indicate the center point of the marking. Certainly, these contrasting indicators can be of more or less arbitrary configuration but it certainly suggests itself to utilize simple symbols such as points, circles or rectangles since reading and interpreting such symbols may require a limited set of image analysis operations to detect them.

An advantage of patterns and producing patterns according to the above may be that a large dynamic range of density levels can be obtained while retaining the readability. It may be thus possible to print patterns that contain large markings/raster points without, for example, losing the digitally coded position information.

According to the third aspect of the invention, a coding pattern located in the image and containing symbols may be read. As according to the above aspects, the symbols may represent at least two different values, each symbol comprising one raster point and at least one marking. The raster point may be included in a raster that may extend over the surface and the value of each symbol may be indicated by the placement of that marking in relation to a raster point. The method may comprise determining markings which at least partially overlap one another and reading for each one of these overlapping markings at least one contrasting indicator, the spatial extent and place within the marking of which indicate the placement of the marking.

Reading can be advantageously carried out by means of an apparatus that can be handheld and communicate wirelessly with, for example, a computer that receives both image information and information from the coding pattern read.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings:

FIG. 5b shows a detail from the image of FIG. 5a;

DESCRIPTION OF PREFERRED EMBODIMENTS

For the sake of clarity, the detailed description of the invention below may be divided into a number of part-descriptions. As an introduction, a coding pattern will be presented with reference to FIGS. 1, 2a-d and 3. This coding pattern can be used for information storage as has been outlined above. As an example, the information stored in the pattern may include position information. After the presentation of the coding pattern, an apparatus intended for reading the pattern is then presented in connection with FIG. 4. After that is shown how an image can be produced by printing a screen pattern in the form of the coding pattern presented, comprising markings of varying extents, referring to FIGS. 5a and 5b. Finally, a method of modifying the appearance of the pattern markings that, on printing an image, overlap one another, is presented with reference to FIGS. 6a and 6b.

In the following discussion regarding the coding pattern a number of calculations take place. These calculations are performed in a processing means, such as a processor connected to a printing device. The software that performs the calculations is written in accordance with the description to follow and it is assumed that the person skilled in the art will choose suitable tools for performing such programming. The software may be present, or stored, in any form known in the art, such as any volatile or non-volatile memory units capable of being connected to the processor and be readable by the processor, such as a diskette or a CD-ROM, as well as propagated signals such as the stream of bits that represent Internet transmission of packets or the carrier waves that are transmitted to satellites.

The coding pattern used below is described in some more detail in our own disclosures PCT/SE00/01895, PCT/SE00/01897 and WO 01/16691 hereby also incorporated by reference.

Figure 1:
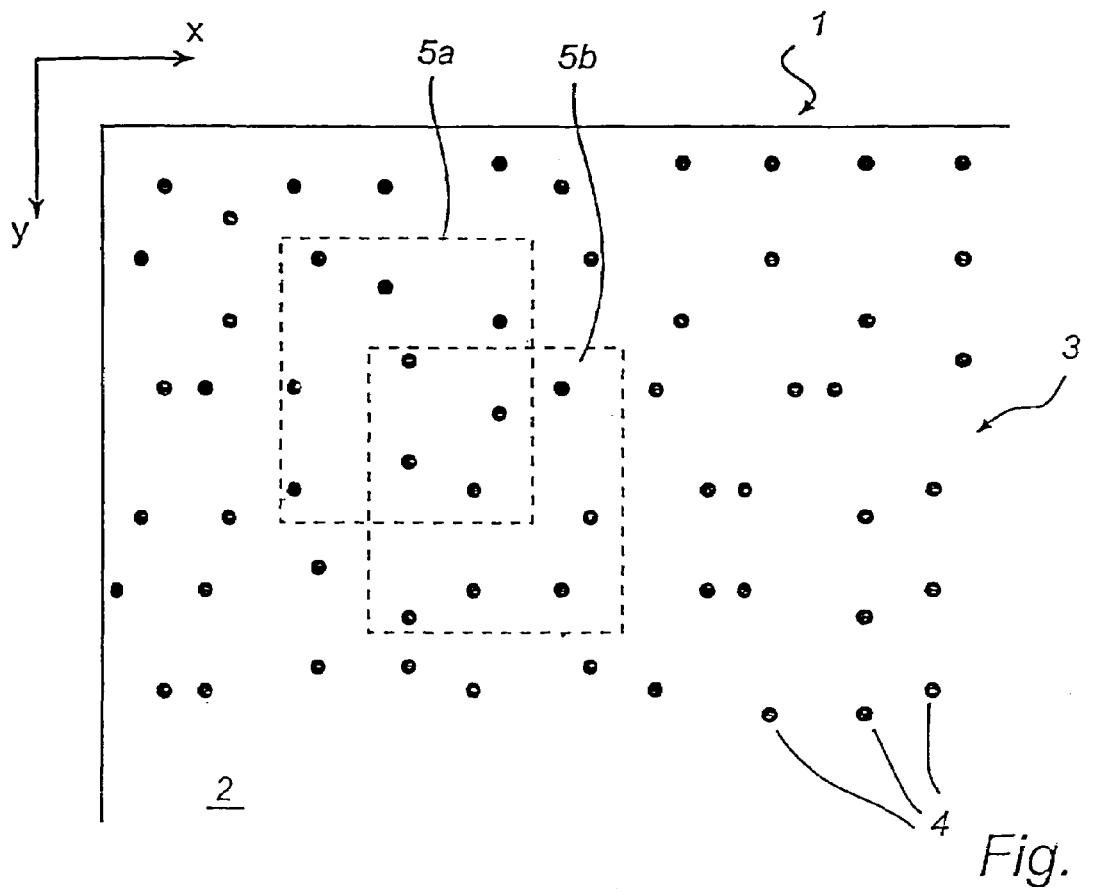
FIG. 1 schematically shows an embodiment of a product according to the present invention which may be provided with a position-coding pattern.
Figure 2:
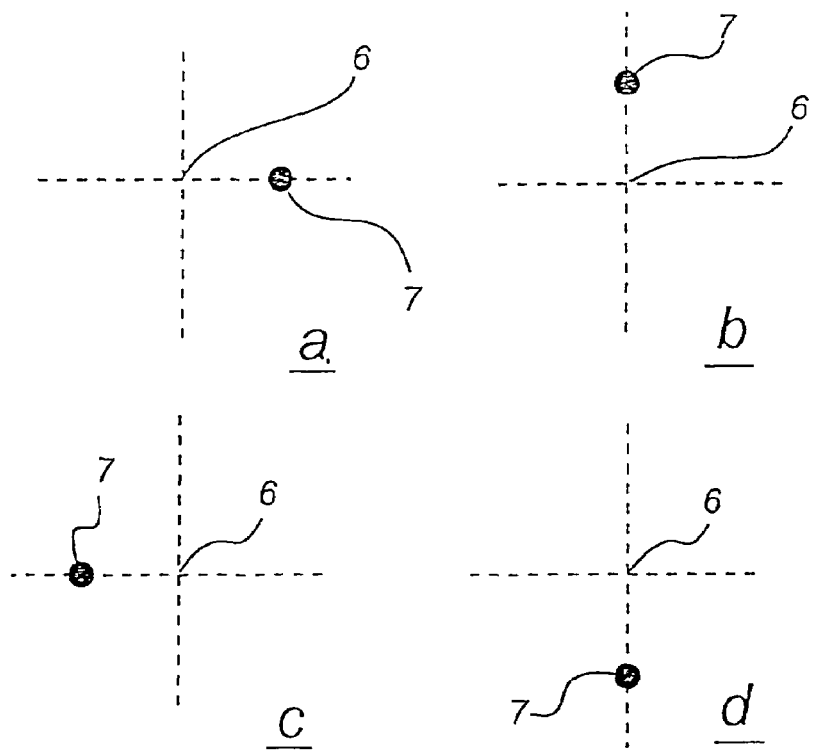
FIGS. 2a-2d schematically show how the symbols can be configured in an embodiment of the invention.

FIG. 1 shows a part of a product in the form of a sheet of paper 1. Sheet 1 may include a principle surface 2 with an optically readable position-coding pattern 3. An apparatus can read position-coding pattern 3 to perform position determination on the surface. The position-coding pattern may further include symbols 4 that may be systematically arranged over the surface 2, giving it a "patterned" appearance. The symbols may include markings that, as shown in FIG. 1, may be round and of constant size. This depiction is exemplary and not exhaustive of the type of shapes that may be employed in accordance with the invention.

Screen-printed images may be made up of a large number of picture elements in the form of points i.e., raster points. An image may be characterized by spatially varying density, with variations in density representing by varying extents of the raster points. Depending on the equipment used for generating the images with the aid of this technique, a widely varying quality in terms of spatial resolution and in terms of number of levels of density may be produced. A determining factor may be the capacity of the equipment with respect to the size of the raster points and the nature of the surface on that the image may be printed. The surface could be a flat sheet of paper, a rounded container, etc.

The effect that may be achieved according to the exemplary embodiment is that additional information may be obtained from an image printed on a product with a screen-printing technique. Recognizing the relationship allows one to develop a coding pattern that permits image to hold a large amount of information. Images without an information-carrying coding pattern would lack the additional "layer" of information that may be contained in the coding pattern.

The paper 1 has an x-coordinate axis and a y-coordinate axis. In this case, the position determination can be performed on the surface of the entire product. In other cases, the surface may constitute a smaller portion or section of the product.

The position-coding pattern 3 may include a virtual raster that may be neither visible to the human eye nor detectable directly by an apparatus that is to determine positions on the surface. Further, as explained below, a plurality of symbols 4 within the pattern, may assume one of four values. In this example, the values are "1"-"4". In this connection, it should be pointed out that the position-coding pattern in FIG. 1 is greatly enlarged for the sake of clarity. Moreover, it is shown only on part of the paper.

Position-coding pattern 3 may be arranged such that the position of a partial surface on the principle surface 2 is coded by symbols. A first and a second partial surface 5a, 5b are shown with dashed lines in FIG. 1. The part of the position-coding pattern 30 (here 3×3 symbols) located on the first partial surface 5a coding or representing a first position and the part of the position-coding pattern which may be located on the second partial surface 5b codes a second position. The position-coding pattern 3 may be thus partly common to the adjoining first and second positions. Such a position-coding pattern may be designated as "floating" in this application.

FIGS. 2a-d show an embodiment of a symbol that can be used in the position-coding pattern according to the invention. The symbol may include a virtual raster point 6, represented by the intersection between the raster lines, and a marking 7. The value of the symbol may be based on where the marking is placed. In the example in FIG. 2, four possible placements are located, one on each of the raster lines that start from the raster points 6. The displacement of marking 7, or more specifically its center of gravity, from the raster point 6 may be of the same magnitude for all values. In the text that follows, the symbol has the value 1 in FIG. 2a, the value 2 in FIG. 2b, the value 3 in FIG. 2c and the value 4 in FIG. 2d. Expressed differently, there are four different types of symbols.

Each symbol can also represent four values "1-4". This entails that the position-coding pattern can be divided into a first position code for the x-coordinate and a second position code for the y-coordinate. The dividing may be carried out according to the following:

| Symbol value | x code | y code |
| --- | --- | --- |
| 1 | 1 | 1 |
| 2 | 0 | 1 |
| 3 | 1 | 0 |
| 4 | 0 | 0 |

The value of each symbol may thus be translated into a first digit, in this case bit, for the x code and into a second digit, in this case bit, for the y code. In this way two completely independent bit patterns are obtained. The patterns can be combined into a common pattern that may be graphically coded by means of a plurality of symbols according to FIG. 2.

Each position may be coded by a plurality of symbols. In this example, 4×4 symbols are used for coding a position in two dimensions, i.e. an x-coordinate and a y-coordinate.

The position code may be made up by means of a number series of ones and zeros that have the characteristic that no sequence of four bits occurs more than once in the series. The number series may be cyclic which means that the characteristic also applies if the end of the series may be coupled together with its beginning. A sequence of four bits thus always has an unambiguously determined position in the number series.

The series can be maximally 16 bits long if it has the characteristic of sequences of four bits described above. In this example, however, only a seven-bits-long series according to the following may be used:

"0 0 0 1 0 1 0"

This series contains seven unique sequences of four bits which code a position in the series according to the following:

| Position in the series | Sequence |
|---|---|
| 0 | 0001 |
| 1 | 0010 |
| 2 | 0101 |
| 3 | 1010 |
| 4 | 0100 |
| 5 | 1000 |
| 6 | 0000 |

For coding the x-coordinate, the number series may be written sequentially in columns over the entire surface to be coded. The coding may be based on the difference or position displacement between numbers in adjoining columns. The magnitude of the difference may be determined by the position in the number series at which the column is to begin (i.e. with which sequence). More specifically, if the difference modulo seven may be taken between, on the one hand, a number coded by a four-bit sequence in a first column and which can thus have the value (the position) 0-6, and, on the other hand, a corresponding number (i.e. the sequence of the same "height") in an adjoining column, the result will be the same independently of where along the two columns the comparison may be made. Thus, it may be possible to code an x-coordinate that may be constant for all y-coordinates by means of the difference between two columns.

Since each position on the surface may be coded by 4×4 symbols in this example, this may provide access to three differences (with the value 0-6), according to the above for coding the x-coordinate. The coding may then be done in such a manner that of the three differences, one will always have the value 1 or 2 and the other two will have the value in the interval 3-6. No differences will thus be zero in the x code. In other words, the x code may be constructed in such a manner that the differences will be as follows:

(3-6)(3-6)(1-2)(3-6)(3-6)(1-2) (3-6)(3-6)(1-2)

Each x-coordinate may be thus coded with two numbers between 3 and 6 and a subsequent number that may be 1 or 2. Subtracting 3 from the high numbers and one from the low one, a number may be obtained in a mixed base that directly provides a position in the x direction from which the x-coordinate can then be determined directly as is shown in the example below.

Using the principle described above, it may be thus possible to code x-coordinates 0, 1, 2 . . . , by means of numbers that represent three differences. These differences may be coded with a bit pattern that may be based on the above number series. Finally, the bit pattern can be coded graphically by means of the symbols in FIG. 2.

In many cases, when inputting 4×4 symbols, one does not obtain a complete number that codes the x-coordinate but instead parts of two numbers. Since the least significant part of the numbers may be obtained from these values, however, a complete number can be reconstructed in a simple manner.

The y-coordinates may be coded in accordance with the same principle used for the x-coordinates. The cyclic number series may be written repeatedly in horizontal rows over the surface to be position-coded. Exactly as in the case of the x-coordinates, the rows are allowed to begin at different positions, i.e. with different sequences, in the number series. For the y-coordinates, however, differences may not be used but the coordinates may be coded with numbers that are based on the starting position of the number series in each row. Having determined the x-coordinate for 4×4 symbols, it may be possible to determine the starting positions in the number series for the rows that may be the y code in the 4×4 symbols. In the y code, the most significant number may be determined by allowing it to be the only one that has a value in a specific interval. In this example, one row of four is allowed to begin in position 0-1 in the number series to indicate that this row relates to the least significant number in a y-coordinate, and the other three begin in position 2-6. In the y direction, there may be a number series according to the following:

(2-6)(2-6)(2-6)(0-1) (2-6)(2-6)(2-6)(0-1)(2-6)

Each y-coordinate may be coded with three numbers between 2 and 6 and a subsequent number between 0 and 1.

Subtracting 1 from the low number and 2 from the high ones provides in the same manner as for the x direction a position in the y direction in mixed base from which the y-coordinate may be determined directly.

Using the above method, 4×4×2=32 positions can be coded in the x direction. Each such position may correspond to three differences that provide 3×32=96 positions. Furthermore, 5×5×5×2=250 positions can be coded in the y direction. Each such position may correspond to 4 rows that provide 4×250=1000 positions. Altogether, 96,000 positions can thus be coded. Since the x coding may be based on differences it may be possible to select the position where the first number series begins. Taking into consideration that the first number series can begin at seven different positions, it may be possible to code 7×96,000=672,000 positions. The starting positions for the first number series in the first column can be calculated when the x-coordinate has been determined. The above-mentioned seven different starting positions for the first series can code different sheets or writing surfaces on a product.

For further illustrating the invention according to this embodiment, a specific example follows here that may be based on the embodiment of the position coding described.

Figure 3:
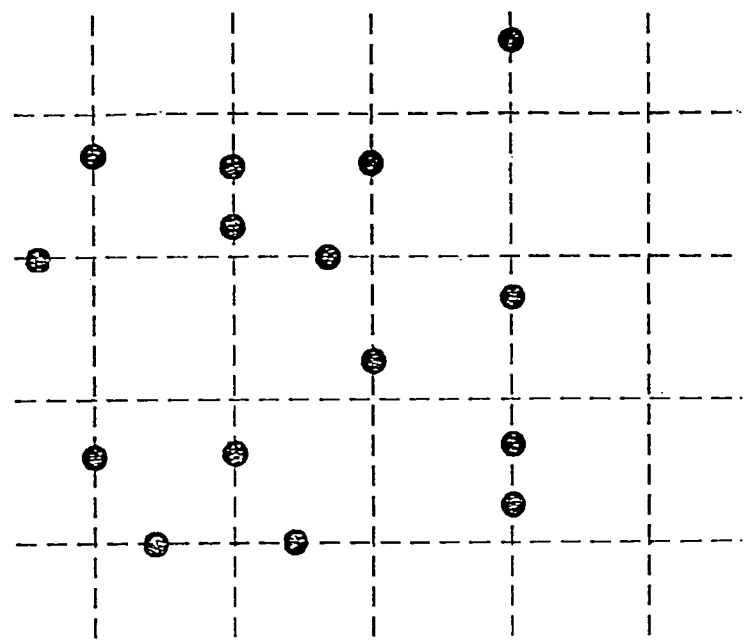
FIG. 3 schematically shows an example of 4×4 symbols which may be used for coding a position in accordance with the invention.

FIG. 3 shows an example of an image with 4×4 symbols that may be read by an apparatus for position determination in accordance with the present invention.

These 4×4 symbols have the following value:

4 4 4 2
3 2 3 4
4 4 2 4
1 3 2 4

These values represent the following binary x and y code:

| x code: | y code: |
|---------|---------|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical x sequences code the following positions in the number series: 2 0 4 6. The differences between the columns become −2 4 2 which modulo 7 provides: 5 4 2 which, in mixed base, codes position (5−3)×8+(4−3)×2+(2−1)=16+2+1=19. Since the first coded x position may be position 0, the difference that lies in the interval 1-2 and that appears in the 4×4 symbols may be the twentieth such difference. Since there may also be a total of three columns for each such difference and there may be a start column, the vertical sequence furthest to the right in the 4×4 x code belongs to the 61st column in the x code (3×20+1=61) and that furthest to the left to the 58th.

The horizontal y sequences code the positions 0 4 1 3 in the number series. Since these series begin in the 58th column, the starting position of the rows may be these numbers minus 57 modulo 7 that may provide the starting positions 6 3 0 2. Translated into digits in the mixed base, this becomes 6−2, 3−2, 0−0, 2−2=4 1 0 0, where the third digit may be the least significant digit in the current number. The fourth digit may then be the most significant digit in the next number. In this case, this must be the same as in the current number. An exception being when the current number consists of the highest possible digits in all positions. It is then apparent that the start of the next number may be one greater than the start of the current number.

The position of the four-digit number becomes 0×50+4×10+1×2+0×1=42 in the mixed base.

The third row in the y code may be the 43rd that may have a starting position 0 or 1 and since there may be four rows in total for each such row, the third row is number 43×4=172. In this example, the position for the top left corner of the 4×4 symbol group may be 58,170.

Since the x sequences in the 4×4 group begin in row 170, the x columns of the entire pattern begin in positions ((2 0 4 6)-169) mod 7=1 6 3 5 of the number series. Between the last starting position (5) and the first starting position, the numbers 0-19 may be coded in the mixed base and by summing up the representations for the numbers 0-19 in the mixed base, the total difference between these columns may be obtained. A primitive algorithm for doing this calculation may generate these twenty numbers and directly sum up their digits. If the sum obtained is called S, the sheet or writing surface may then be given by (5−S) modulo 7.

In the above example, an embodiment has been described where each position may be coded with 4×4 symbols and a number series with 7 bits may be used. Naturally, this is only one example. Positions can be coded with more or fewer symbols. They do not need to be the same amount in both directions. The number series can have different lengths and does not need to be binary but can be based on another base. Different number series can be used for coding in the x direction and coding in the y direction. The symbols can have a different number of values.

Furthermore, in the above example the marking is a point. Naturally, it can have other appearances. For example, it can be in the form of a line that begins at the virtual raster point and extends from there to a certain position.

In the above example, the symbols are used within a square partial surface for coding a position. The partial surface can have a different shape, for example, hexagonal. Neither do the symbols need to be arranged in rows and columns at 90° angles with respect to one another but can also be arranged in other configurations.

Depending on the details of the embodiment, for the position code to be detectable, the virtual raster may need to be determined. This may be done by studying the distance between different markings. The shortest distance that is found between two markings must originate from two adjoining symbols with the value 1 and 3 so that the markings are lying on the same raster line between two raster points. Once such a pair of markings has been detected, the associated raster points can be determined with knowledge of the distance between the raster points and the displacement of the markings from the raster points. When two raster points have been localized, additional raster points can be determined measuring distances to other markings and with knowledge of the mutual distances between the raster points.

Figure 4:
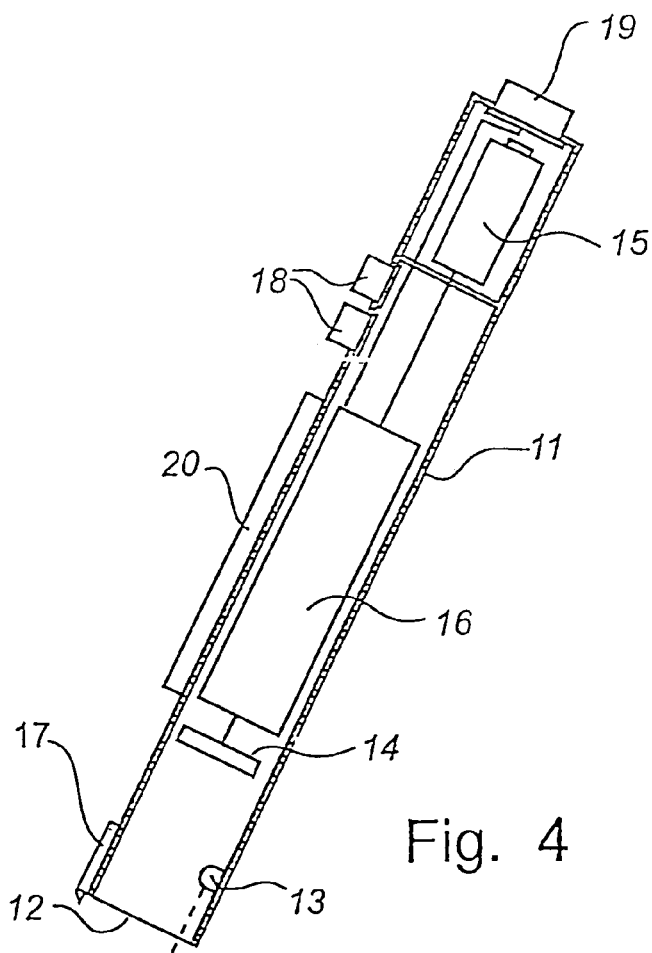
FIG. 4 schematically shows an apparatus according to the present invention which can be used for reading a coding pattern.

FIG. 4 schematically shows an embodiment of an apparatus for position determination. It may include a casing 11 that may have the approximate form of a pen, or similar writhing instrument. In the short end of the casing, an opening 12 may be located. The short end may be intended to bear against, or be held at a small distance from, the surface to which an image may be applied and the position determination or more general information gathering is to take place.

The casing may include an optics part, an electronic circuitry part and a power supply. The optics part may include at least one light-emitting diode 13 for illuminating the surface that may be imaged and a light-sensitive area sensor 14, for example a CCD or CMOS sensor, for registering a two-dimensional image. The apparatus may also contain a lens system. The power supply for the apparatus may be obtained from a battery 15 that may be mounted in a separate compartment in the casing.

The electronic circuitry part may include an image-processing element 16 for determining a position on the basis of the image recorded by the sensor 14 and, more specifically, a processor unit with a processor that may be programmed for reading images from the sensor and carrying out the position determination on the basis of these images.

Thus, the apparatus in this embodiment can also comprise a pen point 17 with the aid of which one can write normal pigment-based writing on the surface on which the position determination is to take place. The pen point 17 may be retracted and extended so that the user can control its use. In certain applications, the apparatus does not need to have any pen point at all or may employ other types of writing implements that are not necessarily pigment-based. In certain applications, the apparatus does not need to have any pen point at all or comprise a fixed, non-retractable, pen point. Moreover, the device may comprise a plurality of retractable pen points, each having, e.g., a different color.

The apparatus also may include buttons 18 to activate and control the apparatus. It may also have a transceiver 19 for wireless transmission, e.g., by IR light or radio waves, of information to and from the apparatus. The apparatus can also include a display 20 for showing positions or recorded information.

In Swedish Patent No. 9604008-4 (herein incorporated by reference) of the Applicant, an apparatus for recording text is described. This apparatus can be used for position determination if it is programmed in a suitable manner. If it is to be used for pigment-based writing, it can also be provided with a pen point, or similar writing instrument.

The apparatus can be divided into different physical casings, a first casing containing components necessary for capturing images of the position-coding pattern and for transferring these to components located in a second casing and perform the position determination on the basis of a recorded image or images.

As mentioned, the position determination is done by a processor having software for locating and decoding the symbols in an image and for determining positions from the codes thus obtained. From the above example, a person skilled in the art can design software that carries out position determination on the basis of an image of a part of a position-coding pattern. Furthermore, a person skilled in the art can design software for printing the position-coding pattern on the basis of the above description.

In the embodiment above, the pattern can be read optically and the sensor may be optical. As mentioned, the pattern can be based on another parameter than an optical parameter. In this case, the sensor should be of a type that can read the current parameter. Examples of such parameters are of chemical, acoustical or electromagnetic character, e.g. resistance, capacitance and inductance. Further, in the embodiment above, the raster is a rectangular grid. It can also have other forms, i.e. non-rectangular.

In the embodiment above, the raster is a grid network, but it can also have other forms. In the embodiment above, it is not the longest possible cyclic number series that is used. This results in a certain redundancy that can be used, for example, for checking the turning of the read group of symbols.

The actual calculations relating to the reading of the coding pattern are performed in processing means, such as those discussed above in connections with FIG. 4, may be a processor within the device itself. It is also feasible to perform the calculations in an external processor connected to the reading device. The software that performs the calculations may be written in accordance with the present disclosure to follow and it is assumed that the person skilled in the art will choose suitable tools for performing such programming. The software may be present, or stored, in any form known in the art, such as any volatile or non-volatile memory units capable of being connected to the processor, such as a diskette or a CD-ROM, as well as propagated signals such as a stream of bits that represent Internet transmission of packets or carrier waves that are transmitted to satellites.

Figure 5A:
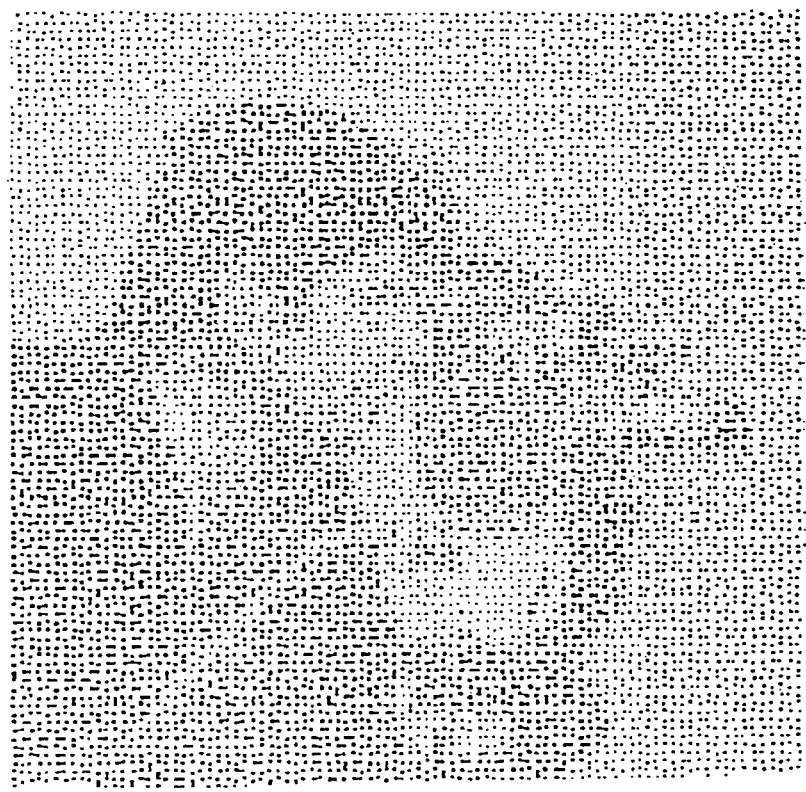
FIG. 5a shows an image in the form of a coding pattern including markings with varying sizes in accordance with the invention.

FIG. 5a shows an image that may be produced of a coding pattern, where the coding pattern may include markings of varying sizes. The symbols may be part of a coding pattern according to the description above in connection with FIGS. 1-3. The aim of FIG. 5a is to illustrate that varying density can be produced with the aid of symbol markings according to the invention. For the sake of clarity, however, the image is shown at a very coarse scale. Certainly, the sizes of the markings and thus the detail resolution may depend on the capacity of the printing device that generates the image printout as can be easily understood by a person skilled in the art.

Figure 5B:
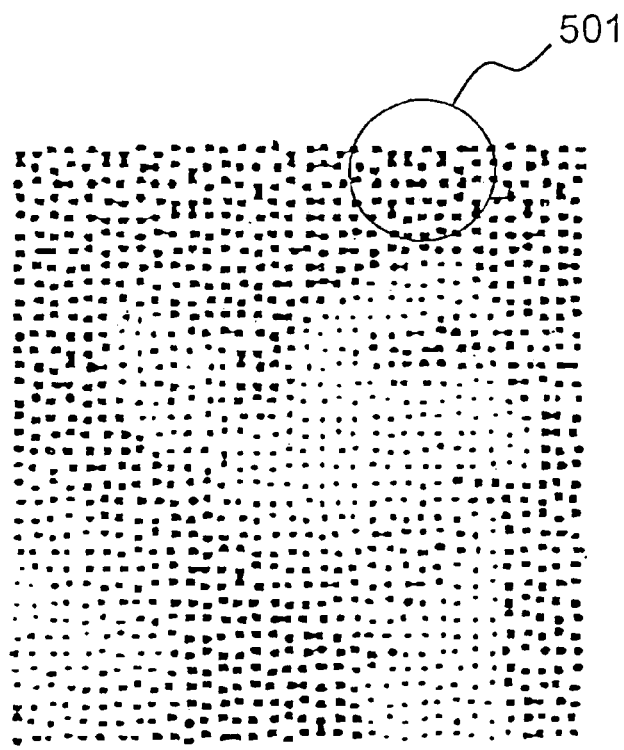

FIG. 5b shows a detail from the image in FIG. 5a and shows more clearly than in FIG. 5a how the markings can vary in spatial extents. This spatial extent may be viewed as the shape, construction, density and/or relative position to other markings. A large number of markings have such positions, determined by the coding, and extents so that they overlap adjacent markings. FIG. 5b provides an example of an area 501 that contains such overlappings. It should be noted that the markings as shown in FIGS. 5a and 5b do not have the same general appearance as the markings shown in FIGS. 1-3 that are more or less circular. This illustrates the fact that, within the scope of this invention, the appearance of the markings is not limited to some specific shape but can advantageously depend on the capacity of the printing device. The examples in FIGS. 5a and 5b originate from a conventional laser printer with limited detail resolution that is why the shapes of the markings vary.

Figure 5C:
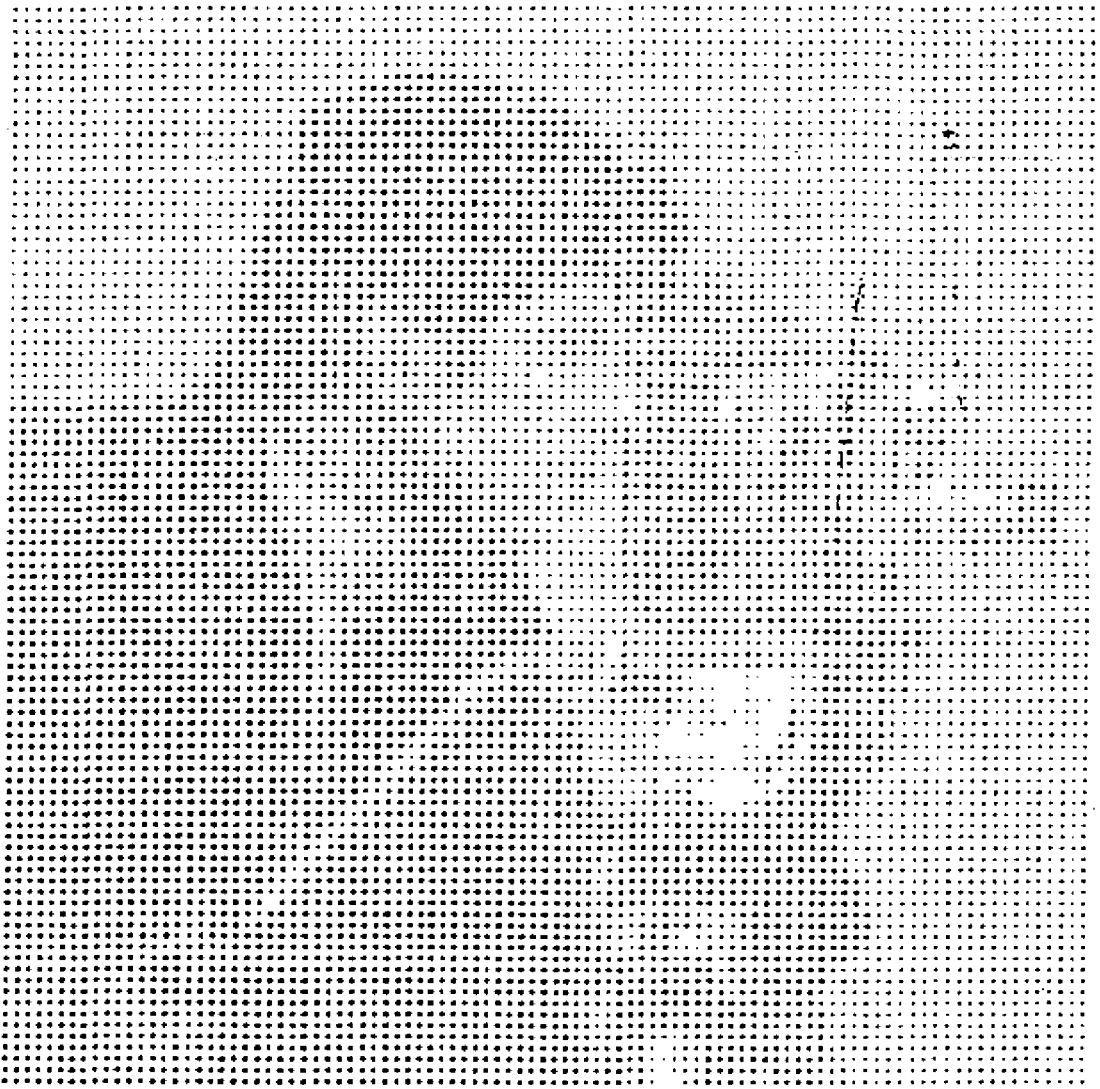
FIG. 5c shows the image of FIG. 5a printed according to prior art.

In FIG. 5c, the image of FIG. 5a is printed according to conventional technique, with no coding pattern involved. As can be seen, by comparing with the image of FIG. 5a, introduction of the coding pattern leads to merely a slight degradation of the quality of the image itself.

Figure 6A:
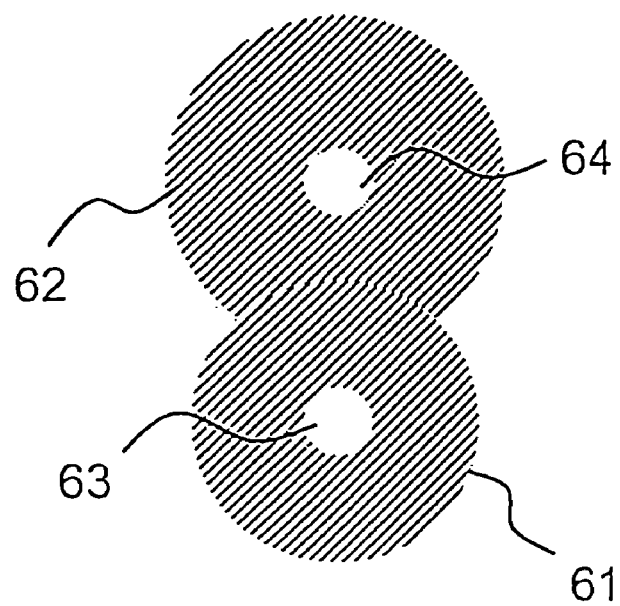
FIGS. 6a and 6b show details from an image where overlapping markings have been provided with contrasting indicators in accordance with the invention.
Figure 6B:
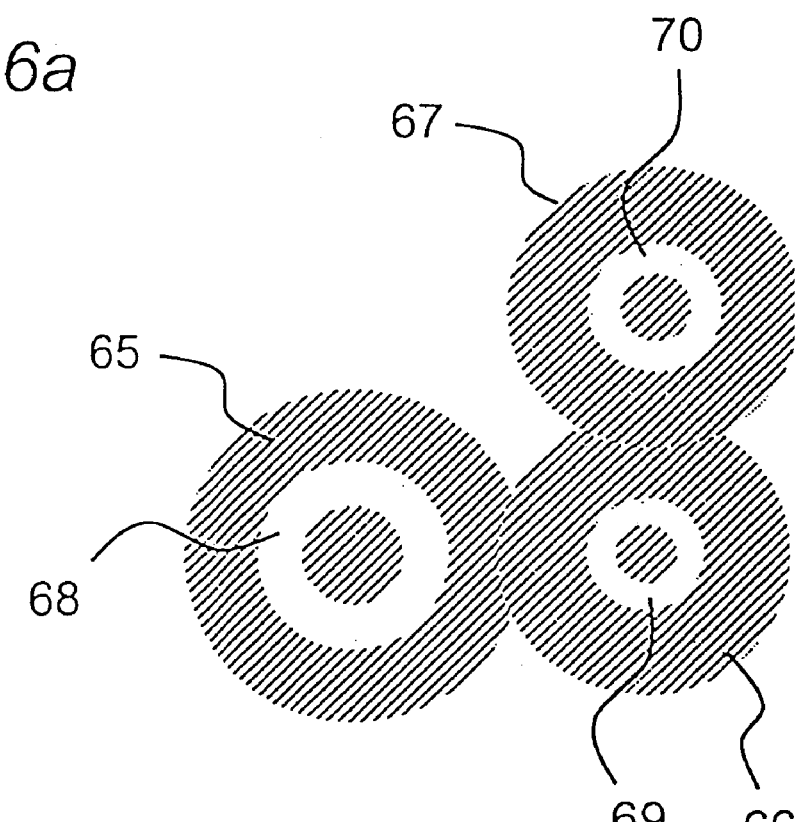

FIGS. 6a and 6b show schematic illustrations of markings 61, 62, 65, 66, 67 that overlap one another. The markings are presented in the form of filled-in circles. For the sake of clarity, the fillings have been carried out by means of shading in contrast to the solidly filled-in markings illustrated earlier in FIGS. 1-3 and 5. The markings in FIGS. 6a and 6b have also been provided with contrasting indicators 63, 64, 68, 69, and 70.

The overlapping markings 61, 62 in FIG. 6a may be provided with respective circular contrasting indicators 63, 64, placed in the center of the respective marking. The overlapping markings, shown as 65, 66, 67, may be further provided with respective contrasting indicators 68, 69, 70 in the form of circles that may be concentric with the respective marking and centered with respect to the center of the respective marking.

On generating an image such as a picture, where, due to the density one or more markings spatially overlap, the markings may be provided with a contrasting indicator. The generation of markings is preferably done by means of software in a suitably programmed computer. The generating process may include determining, with knowledge of the density of each picture element, the extents of the markings and deciding if adjacent markings are to overlap one another on printing or printout. If such overlappings are found, these markings may be provided with a contrasting indicator according to, for example, one of the illustrations in FIG. 6a or 6b. However, it should be pointed out once again that the markings and the contrasting indicators could be of more or less arbitrary form.

Inputting of symbols having markings with contrasting indicators may preferably be done with a computer provided with suitably designed software. An inputting process may include detecting two or more overlapping markings. The detection can include, for example, inputting of a spot of undetermined spatial configuration, the appearance of which, for example, can be one of the illustrations in FIG. 6a or 6b. On such a finding, the software may analyze the appearance of the spot with a known image-analysis technique, to identify contrasting indicators. These contrasting indicators, for example, may then be analyzed in terms of their position and extent, a center point of the respective indicators being found and interpreted as a center point of a respective marking.

Although the storage of position information in a coding pattern, and reading of position information from a coding pattern, is shown in the above example, other information can also be relevant. Text in the form of an explanation of the image or copyright information may also provide relevant information.

Concurrently filed with the application for this patent are applications entitled Systems and Methods for Information Storage based on Swedish Application No. 0000947-2, filed Mar. 21, 2000, and U.S. Provisional Application No. 60/207, 839, filed May 30, 2000; Secured Access Using a Coordinate System based on Swedish Application No. 0000942-3, filed Mar. 21, 2000, and U.S. Provisional Application No. 60/207, 850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr. 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No. 60/261,121, filed Jan. 12, 2001; and a new U.S. Provisional Application entitled Communications Services Methods and Systems.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A system for handling digitized information, comprising:
    an interactive image which comprises human-readable information and a machine-readable code embedded in one and the same layer of printing ink on a product surface, wherein the machine-readable code encodes a position related to the human-readable information;
    a reading device configured to detect at least part of the machine-readable code in the interactive image; and
    a computing device configured to identify an action to be taken as a function of the detected machine-readable code.

2. The system of claim 1, wherein said action comprises at least one of retrieving further information, presenting further information to a user of the reading device, ordering products, and ordering financial services.

3. The system of claim 2, wherein said further information comprises multimedia information.

4. The system of claim 1, wherein the computing device is configured to identify said action by matching at least one position derived from the machine-readable code against a database in which positions are associated with information handling rules.

5. The system of claim 1, wherein the machine-readable code comprises a position-coding pattern.

6. The system of clam 5, wherein the position-coding pattern comprises a plurality of partial surfaces, each encoding a unique position in a predetermined coordinate system.

7. The system of claim 6, wherein the reading device, when placed by a user into an operative position to the interactive image, is configured to detect one of said partial surfaces.

8. The system of claim 6, wherein said partial surfaces are partly overlapping for mutually adjacent positions in said coordinate system.

9. The system of claim 6, wherein each partial surface comprises a plurality of code symbols.

10. The system of claim 9, wherein each code symbol comprises a raster point and at least one marking; the raster point being included in a raster which extends across the interactive image; at least one value of each code symbol being indicated by a displacement of a center point of the at least one marking in relation to a raster point.

11. The system of claim 9, wherein the value of each code symbol is translatable into at least one first number which is used for coding a first position coordinate and at least one second number which is used for coding a second position coordinate, the code symbols in the machine-readable code together representing a first position code for the first position coordinate and a second position code for the second position coordinate.

12. The system of claim 1, wherein the machine-readable code includes code symbols representing at least two different values, each code symbol comprising a raster point and at least one marking; the raster point being included in a raster which extends over the product surface; at least one value of each code symbol being indicated by a displacement of a center point of the at least one marking in relation to a raster point; and the markings each having a spatial extent which, in combination, at least partially form the human-readable information.

13. The system, of claim 12, wherein the markings have essentially identical shape and varying size.

14. The system of claim 12, wherein at least markings that partially overlap one another comprise at least one contrasting indicator that indicates a center point of the marking.

15. The system of claim 1, wherein the machine-readable code is based on a first cyclic number series which has the characteristic that no sequence with a first predetermined length occurs more than once in the number series.

16. The system of claim 1, wherein the machine-readable code encodes a first position coordinate by a first cyclic number series being repeated in columns in the interactive image, the columns beginning at different places in the number series, and the first cyclic number series having the characteristic that no sequence with a first predetermined length occurs more than once in the number series.

17. The system of claim 1, wherein the machine-readable code encodes a second position coordinate by a second cyclic number series being repeated in rows in the interactive image, the rows beginning at different places in the number series, and the second cyclic number series having the characteristic that no sequence with a second predetermined length occurs more than once in the number series.

18. The system of claim 1, wherein the machine-readable code encodes at least one of a number, and a text related to the human-readable information.

19. The system of claim 1, wherein the human-readable information comprises a photographic reproduction.

20. The system of claim 1, wherein the reading device is handheld.

21. A product which has a surface provided with an interactive image which comprises human-readable information and a position-coding pattern embedded in one and the same layer of printing ink on the surface, wherein the position-coding pattern comprises a plurality of partial surfaces, each encoding a unique position in a predetermined coordinate system.

22. A method of enabling a user to instruct a computing device via:
- a printed image which comprises human-readable information and a machine-readable code embedded in one and the same layer of printing ink on a product surface, wherein the machine-readable code encodes a position related to the human-readable information; and
- a reading device which detects at least part of the machine-readable code and generates coding information; the method comprising the steps of, in the computing device:

receiving the coding information from the reading device;
identifying an action to be taken as a function of the coding information; and
initiating the action.

23. A system for handling digitized information, comprising:
- an interactive image which comprises human-readable information and a machine-readable code embedded in one and the same layer of printing ink on a product surface, wherein the machine-readable code comprises a position-coding pattern comprising a plurality of partial surfaces, each encoding a unique position in a predetermined coordinate system;
- a reading device configured to detect at least part of the machine-readable code in the interactive image; and
- a computing device configured to identify an action to be taken as a function of the detected machine-readable code.

* * * * *

UNITED STATES PATENT AND TRADEMARK OFFICE
CERTIFICATE OF CORRECTION

PATENT NO.        : 7,422,154 B2
APPLICATION NO.   : 11/525996
DATED             : September 9, 2008
INVENTOR(S)       : Petter Ericson It is certified that error appears in the above-identified patent and that said Letters Patent is hereby corrected as shown below:

Title Page,

Related U.S. Application Data, item (60) should read --Provisional application No. 60/207,838 Mar. 30, 2000--;

Related U.S. Application Data, item (62) should read --Division of application No. 09/812,901, filed on Mar. 21, 2001, now Pat. No. 7,143,952--; and Foreign Application Priority Data, item (30) should read --Mar. 21, 2000 (SE) 0000950-6--.

Signed and Sealed this

Twenty-fourth Day of February, 2009

JOHN DOLL
*Acting Director of the United States Patent and Trademark Office*